United States Patent [19]
Thomas

[11] Patent Number: 5,327,305
[45] Date of Patent: Jul. 5, 1994

[54] TAPE FORMAT DETECTION SYSTEM
[75] Inventor: Kimberly I. Thomas, Ypsilanti, Mich.
[73] Assignee: Conner Peripherals, Inc., San Jose, Calif.
[21] Appl. No.: 930,740
[22] Filed: Aug. 14, 1992
[51] Int. Cl.⁵ .................. G11B 15/48; G11B 15/18
[52] U.S. Cl. ................... 360/74.5; 360/74.4; 360/69; 360/72.1
[58] Field of Search .......... 360/74.5, 74.4, 74.6, 360/69, 72.1, 72.2, 72.3

[56] References Cited
U.S. PATENT DOCUMENTS

| | | | |
|---|---|---|---|
| 4,472,750 | 9/1984 | Klumpp et al. | 360/78.01 |
| 4,498,129 | 2/1985 | Velazquez | 364/174 |
| 4,553,150 | 11/1988 | Masegawa | 360/74.4 |
| 4,646,175 | 2/1987 | Sokolik et al. | 360/78.02 |
| 4,647,994 | 3/1987 | Irwin et al. | 360/85 |
| 4,796,110 | 1/1989 | Glass et al. | 360/53 |
| 4,843,490 | 6/1989 | Haragushi | 360/69 |

Primary Examiner—Aristotells Psitos
Assistant Examiner—Varsha V. Sheladia
Attorney, Agent, or Firm—Fliesler, Dubb, Meyer & Lovejoy

[57] ABSTRACT

A series of longitudinal tape movement and lateral tape head movement operations are performed to collect data by which the physical format or cartridge type and also the magnetic format are simultaneously determined. The tape format detection system works during the load point seeking sequence and it is therefore able to determine the tape format type while the tape head is being positioned for use. Both longitudinally spaced and laterally spaced format identification fingerprints can be detected and analyzed.

12 Claims, 4 Drawing Sheets

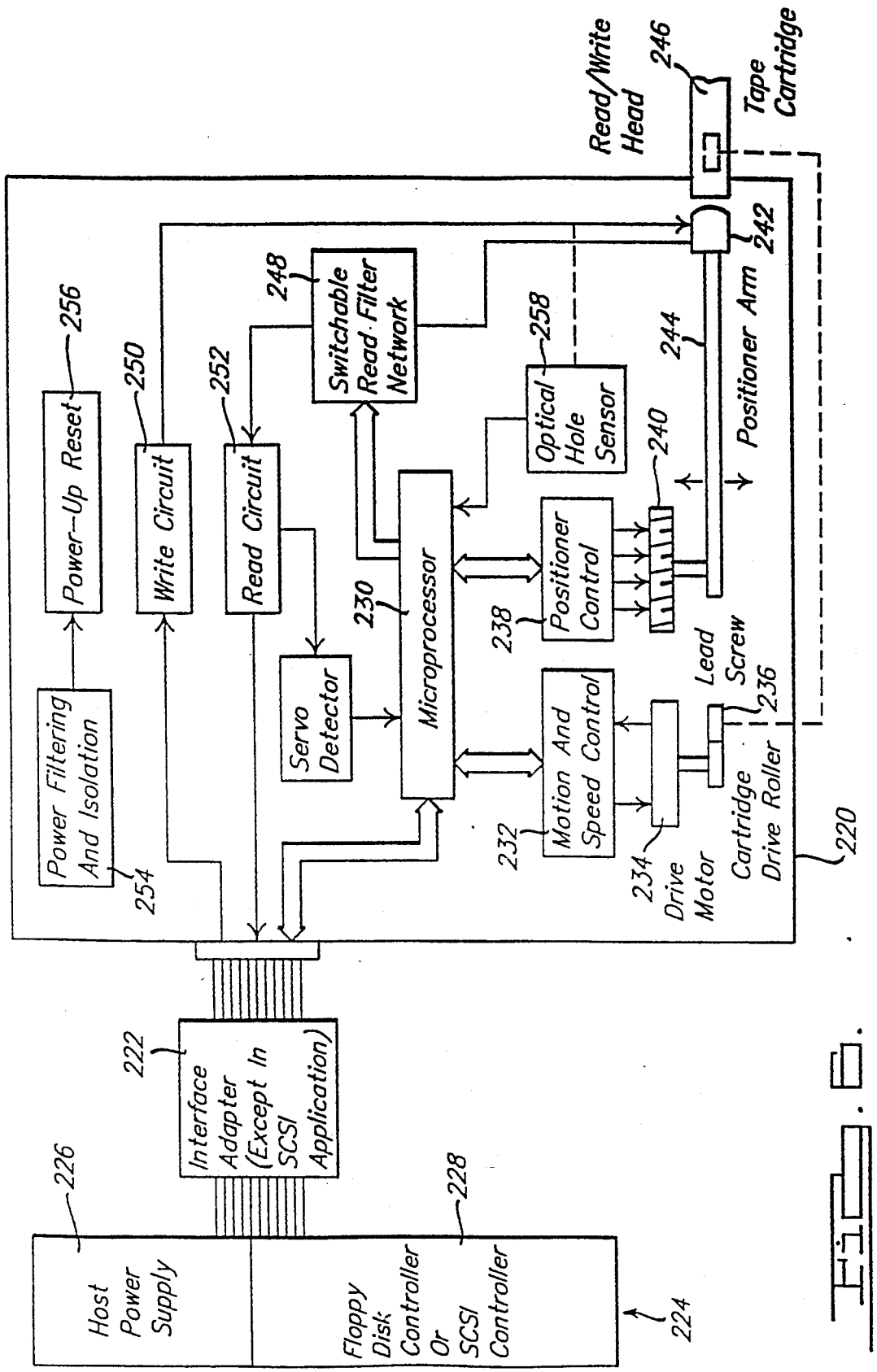

TAPE FORMAT DETECTION SYSTEM

BACKGROUND AND SUMMARY OF THE INVENTION

The present invention relates generally to serially recorded magnetic tape storage. More particularly, the invention relates to a system for detecting whether a magnetic tape has been previously recorded and, if so, in what format.

Digital computers have traditionally used some form of mass data storage to complement the main system memory. In today's computers main system memory is usually implemented using solid-state random access memory devices or RAM. Conventionally today's computer systems also employ a magnetic hard disk system as the primary mass storage medium.

Although in the broadest sense, solid-state RAM and magnetic disk storage systems are both digital data storage media capable of functioning as computer "memory," the solid-state RAM is accessed far more quickly than magnetic disk. Thus, solid-state RAM is usually relegated to time critical data storage needs. In contrast, disk storage has a slower access time but is less costly on a per byte storage basis. In addition, unlike most solid-state RAM devices, which require essentially a continuous connection to a power source, magnetic disk storage is nonvolatile and is capable of storing data even when the power is turned off. Thus magnetic disk storage media is often relegated to the function of primary mass data storage, i.e., the place where executable computer code, data records, help files and the like are stored for use on a sporadic basis.

Although presently lower in cost than solid-state RAM storage, magnetic disk storage technology is still quite costly. Although prices vary depending on the storage capacity, the hard disk subsystem still comprises a major cost component of most business computers in use today. Overall, hard disk systems are quite reliable. However, head crashes and other hard disk system failures do occur from time to time. Failures of this nature can be quite catastrophic, since head crashes often cause physical damage and thus it is not possible to recover data after a head crash has occurred.

To guard against data loss due to hard disk failure many computer systems employ a secondary mass storage system as a backup. Magnetic tape storage is by far the preferred medium for secondary storage today. Magnetic tape has the advantage of being far more economical than even magnetic disk technology on a per byte storage basis. Of course, because the data must be stored serially (i.e. longitudinally) on the tape, data access time is slower than with disk.

No doubt in part due to its cost advantage, magnetic tape media, sometimes called "streaming tape" media, has proliferated as the means for providing backup of computer systems and computer networks. This rise in popularity has given rise to a proliferation of different tape formats, each offering certain advantages to different segments of the marketplace. Today streaming tape is usually sold in a self-contained cassette or cartridge, of which there are a number of different types. Unfortunately, the proliferation of different data storage formats and different cartridge types are incompatible with one another. Thus it has not been traditionally possible for the user of one system to exchange data with the user of a different system. Similarly, this incompatibility has presented problems for users who are upgrading to new equipment but who may have important data stored on an old-style cartridge or in an incompatible format.

The way around this problem for most users has been to employ two separate tape drive systems in order to effect a data transfer or migration from one format to the other. This, of course, requires the user to own or have access to both types of equipment. It would be far more convenient if the user could acquire a single tape drive which is automatically capable of determining or identifying the format of a given tape and automatically adjusting the operating parameters to allow that tape to be read, and preferably written in the tape's native format. Unfortunately, present-day tape drive systems have not been capable of this.

The present invention addresses the tape incompatibility problem by providing a system which will automatically identify the format of a data storage tape. Once the format is identified, the drive parameters may be adjusted appropriately to allow the tape to be read, and optionally written in either the tape's native format or in a new format. The invention thus renders the tape drive system far more versatile and easier for the less technically skilled user to operate.

The invention provides a method of identifying the format of a data storage tape in which the tape and tape head are moved in a preprogrammed manner to perform a series of investigative steps designed to efficiently and quickly gather data about which the format and cartridge type of the tape can be deduced.

More specifically, as part of the series of investigative steps, the tape is moved longitudinally while searching for physical format or cartridge type holes and a datum indicative of the cartridge type is stored. In addition, a head location datum is at least temporarily stored to indicate the longitudinal position of the transducer head relative to the tape.

Also during the investigative steps, while the tape is moved longitudinally, the transducer head is moved laterally, searching for laterally spaced magnetic marks or fingerprints. If laterally spaced magnetic marks are located, a lateral spacing datum is at least temporarily stored.

In addition, during the investigative steps, while the tape is moving longitudinally, a search is performed for longitudinally spaced magnetic marks or fingerprints. If longitudinally spaced magnetic marks are located, a longitudinal spacing datum is at least temporarily stored. Then, using the head location datum, the physical format datum and at least one of the stored lateral spacing datum and stored longitudinal spacing datum are used to identify the data format and physical cartridge type of the data storage tape.

The above described method is can be implemented to permit a backward looking mechanism, i.e., the method may be performed while the tape is being moved in reverse to the beginning of tape position. The above method steps are preferably integrated, allowing the cartridge type and recording format information to be gathered simultaneously. This results in an efficient format identification system.

For a more complete understanding of the invention, its objects and advantages, reference may be had to the following specification and to the accompanying drawings.

BRIEF DESCRIPTION OF THE DRAWINGS

FIG. 6 is a hardware block diagram illustrating a typical circuit configuration with which the invention may be implemented.

DETAILED DESCRIPTION OF THE PREFERRED EMBODIMENT

Figure 1:
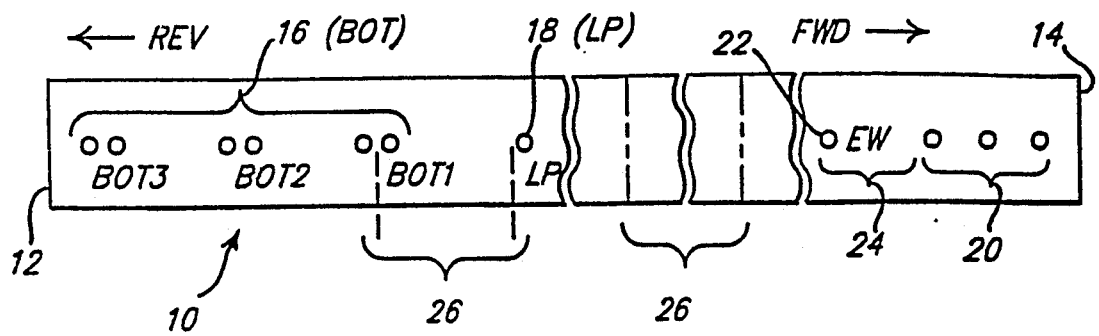
FIG. 1 is a diagrammatic view of a section of magnetic recording tape, useful in explaining the physical format or cartridge type holes.

Referring to FIG. 1 a section of magnetic data storage tape is depicted at 10. The physical beginning of the tape is at 12 and the physical end of tape is at 14. In accordance with present-day tape format standards a plurality of BOT holes 16 are longitudinally disposed in spaced apart pairs adjacent the physical beginning of tape. A load point or LP hole 18 is disposed longitudinally spaced from the BOT holes in the forward direction. In FIG. 1 the forward direction is designated FWD and the reverse direction is designated REV. Tape 10 further includes a series of end of tape holes or EOT holes 20 adjacent the physical end of tape and a longitudinally spaced early warning hole 22 which demarks the beginning of the turnaround area 24. The majority of the midportion of the tape comprises the data area 26. The region between the LP hole 18 and data area 26, and also between the data area 26 and the EOT hole 22 comprise the region where continuous servo information may be recorded.

Figure 2:
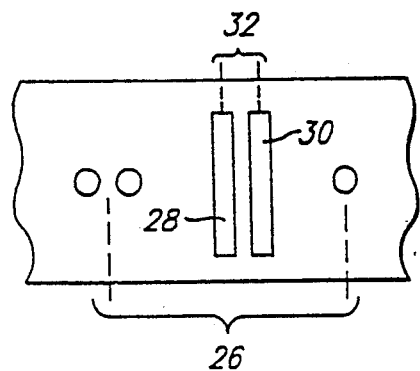
FIG. 2 is an enlarged view of a segment of tape between the LP and BOT holes showing the longitudinally spaced format density fingerprint.
Figure 3:
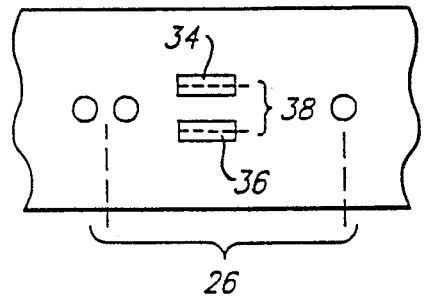
FIG. 3 is an enlarged view of a segment of tape between the LP and BOT holes showing the laterally spaced format density fingerprint.

The first pair of BOT holes most closely adjacent LP hole 18 are designated BOT1. Moving longitudinally in the reverse direction from BOT1, the next pair of BOT holes are designated BOT2. The third pair of BOT holes, most closely adjacent the physical beginning of tape 12 are designated BOT3. The region between BOT1 and LP is defined as the head load area 26. FIGS. 2 and 3 are magnified views of this head load area 26. It is in the head load area 26 that the characteristic marks or fingerprints are written to designate the format of data previously recorded on the tape.

The physical format holes define the tape layout. These holes are placed in the tape by the tape manufacturer. These holes are adapted to be optically read and hence do not depend on what type of data or data format has been recorded on the tape. Since these holes are present even on new, unformatted tapes, they represent the basic tape layout information, independent of magnetic recording format.

Data storage tape of the type shown in FIG. 1 is suitable for being recorded in a number of different recording formats and recording densities. Usually the recording format and recording density is determined when the tape is magnetically formatted before or during its first use. Formatting information is written in the head load area 26 by the recording of characteristic magnetic marks or fingerprints.

There are at least two basic types of recording formats in popular use today, the Irwin or Acutrack format and the QIC format. Each of these basic format types is available in a plurality of different data storage densities.

The Irwin or Acutrack format is characterized by a fingerprint comprising data written in the head load area 26 in two laterally extending regions or bands 28 and 30. See FIG. 2. These bands are longitudinally spaced by a longitudinally spacing distance 32 which is indicative of or characteristic of the recording density.

The QIC format is characterized by magnetic marks or fingerprints written in the head load area 26 in the form of longitudinally extending bands 34 and 36. See FIG. 3. These bands are laterally spaced apart a lateral spacing distance 38 which is indicative of or characteristic of the recording format density.

The present invention is able to automatically gather all pertinent information regarding the physical tape layout and any recorded format—identifying fingerprints, in order to determine, without user intervention, whether a tape has been previously recorded and, if so, in what format. The presently preferred embodiment will be described in connection with the flowchart of FIG. 4. For a more detailed understanding, the reader is directed to the pseudo code listing in the Appendix. The presently preferred embodiment has been optimized to identify the Irwin or Acutrack format more quickly. If desired, however, the data gathering steps and logic sequences may be reconfigured or optimized to recognize the QIC format more quickly.

Figure 4A:
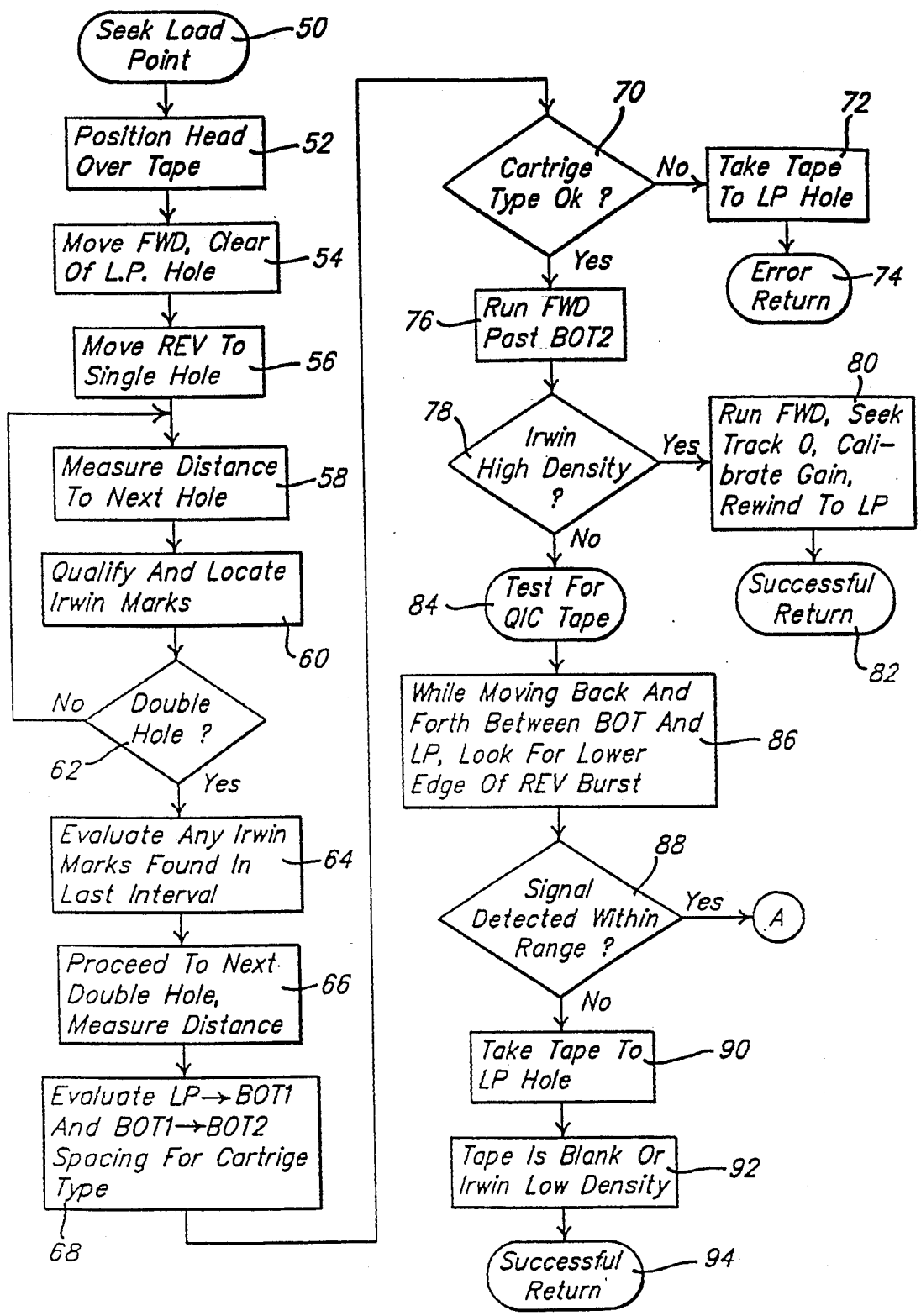
FIGS. 4a and 4b comprise a flowchart illustrating the presently preferred software embodiment.
Figure 4B:
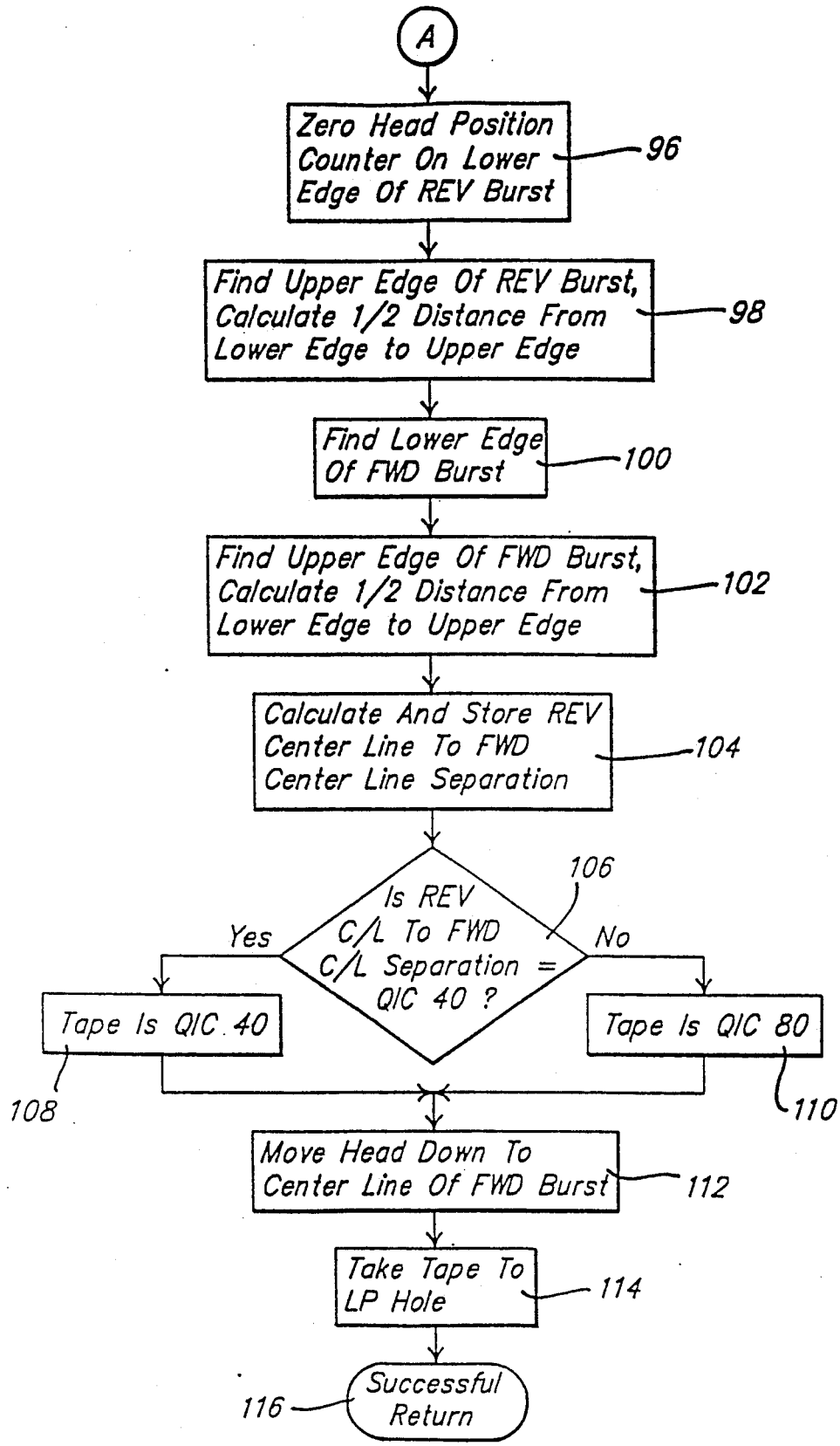

Referring now to FIG. 4 (i.e., FIGS. 4a and 4b) the presently preferred embodiment comprises a series of data gathering steps and logical sequences which are integrated into the "Seek Load Point" function of the tape drive mechanism. Accordingly, the presently preferred sequence begins in the Seek Load Point step 50. At this stage in the control sequence the tape head may be randomly positioned at some lateral position which may not necessarily be aligned with a specified tape track. Thus the first step in the presently preferred sequence is to position the tape head over the tape (step 52). This entails moving the tape head to a prespecified, fixed location preferably by causing the head to be driven to the full bottom extent of travel and then indexed upwardly a fixed amount which is known to be somewhere on the tape in a valid data storage region (i.e., on one of the recording tracks).

Next, at step 54 the tape is moved in the forward direction until the head is past the LP hole. It will be recalled that the LP hole is a single hole and is thus distinguishable from the BOT holes which are arranged in pairs. In the presently preferred implementation the tape may be moved in the forward direction until a single hole (presumed to be the LP hole) is encountered or until a prespecified length of tape has been traversed. In the presently preferred embodiment step 54 considers the head to be past the LP hole either if the LP hole is actually encountered or if at least 60 inches of tape have been scanned since the last set of double holes. This will account for the possibility that the tape may be loaded with the head already past the LP hole. Thus step 54 will not require the tape to be moved forward its entire length (e.g., 300 feet) to the early warning hole 22 before step 54 terminates. The prespecified distance of 60 inches ensures that regardless of where the tape may be wound when initially loaded, moving forward that prespecified distance ensures the head is past the LP hole.

Next, in step 56 the tape is moved in the reverse direction until a single hole is encountered. Since at this stage it cannot be said with certainty that the single hole encountered is the LP hole, the procedure continues in step 58 to measure the distance to the next hole while continuing to move in the reverse direction. The measured distance to the next hole as determined in step 58 is stored at least temporarily in a memory location or register. Simultaneously while step 58 is being performed, the routine searches for longitudinally spaced magnetic marks or fingerprints of the type depicted in FIG. 2. If any magnetic marks located can be qualified as the Irwin or Acutrack format, then the location of those marks is temporarily stored in memory locations, registers or on the stack. Only marks which persist for a predetermined length of time are qualified as potentially being Irwin format marks.

If the next encountered hole of step 58 is a double hole, the procedure branches at step 62. If a double hole was encountered, the procedure is able to infer that the tape head is now in or adjacent to the head load area 26. In the alternative, if the next encountered hole of step 58 is not a double hole, the procedure branches at step 62 back to step 58 where the tape continues to move in the reverse direction, looking for the next encountered hole and recording the location of any Irwin marks encountered in the process.

Assuming that the double hole was encountered, flow branches from step 62 to step 64 at which any Irwin format marks found in the last interval are evaluated. The Irwin marks are evaluated in step 64 by measuring the distance between the two marks, if located. The distance may be measured by subtracting the mark location values stored in step 60. Once determined, this spacing value may be stored in a memory location or register.

Next the procedure continues in step 66, still moving the tape in the reverse direction, until the next double hole is encountered. When encountered, the double hole position is at least temporarily stored in a memory location or register.

Thereafter, in step 68 the stored locations of the LP, BOT1 and BOT2 holes are used to evaluate the LP-BOT1 spacing and the BOT1-BOT2 spacing in order to determine the physical tape layout format or cartridge type. To account for situations in which the cartridge type is an unrecognized type or unsupported, the software at step 70 checks the evaluated spacings against a stored list or lookup table to determine whether the cartridge is supported or not. If not, in step 72 the tape is wound to the LP hole and an error condition is returned at step 74.

If the cartridge type is a valid, recognized type, the tape is then run forward past the BOT2 hole at step 76 and a test is performed at step 78 to see whether the magnetically recorded fingerprint data is indicative of the Irwin or Acutrack high density. This is done by comparing the data stored in step 64 with predefined data which may be stored in a list or lookup table. If the magnetic format is found to be the Irwin high density format, the procedure branches to step 80 which causes the tape to be wound forward while track 0 is located. At this time the gain of the system is also calibrated and then the tape is rewound to the LP position and a successful return is signaled at step 82.

If the tape format does not pass the Irwin high density test at step 78, the program then branches to a routine which tests for the QIC format. This routine begins at step 84. First, at step 86, while moving the tape back and forth between the BOT1 and LP holes, the tape head is moved laterally seeking the lower edge of the REV burst. The REV burst is one of the characteristic magnetic marks or fingerprints indicative of the QIC format. The presently preferred embodiment effects a ping-pong search pattern when testing for QIC tape format. This is accomplished by slewing the head up (laterally back and forth across the tape) while simultaneously winding the tape longitudinally back and forth between the BOT1 and LP hole positions.

During the ping-pong search pattern, if a signal is detected within a range indicative of a QIC formatted tape, the program branches at step 88 to continue processing the instructions shown in FIG. 4b. In the alternative, if no signal within a QIC format range is detected, the routine proceeds to step 90 where the tape is wound to the LP hole. The tape is then declared to be either blank or an Irwin low density format. See step 92. Thereafter, a successful return is signaled at step 94.

Proceeding now to FIG. 4b, if a signal was detected within the QIC format range at step 88, the procedure then continues with step 96. In this step the head position counter is zeroed by referencing it to the lower edge of the REV burst. Next, in step 98, the upper edge of the REV burst is located and the centerline is then calculated as being one-half the distance from the lower edge to the upper edge of the REV burst. The centerline of the REV burst is used, as will be seen below, as one of the measurement points by which the QIC format is established. Preferably the calculated centerline value is at least temporarily stored in a memory location or register pending the determination of the FWD burst centerline.

Accordingly, in step 100 the lower edge of the FWD burst is located. Thereafter, the upper edge of the FWD burst is located and the centerline is calculated as one-half the distance between the lower and upper edges. See step 102. Next, in step 104 the centerline separation between the FWD and REV bursts is calculated and this value may be temporarily stored in a memory location or register.

Referring to step 106, the centerline spacing determined in step 104 is evaluated by comparing it with a stored value indicative of the QIC 40 format. If the spacing matches the QIC 40 format spacing, the tape is declared to be a QIC 40 format in step 108. If the tape is not found to be a QIC 40 format, it is then declared to be a QIC 80 format in step 110. In this regard, the presently preferred embodiment has been implemented to distinguish between the two currently defined formats of the QIC family. If, in the future, additional density format are added to the QIC family, the test performed at step 106 can be extended to include those other density formats.

Having thus found the tape to be of either a QIC 40 or a QIC 80 format, the procedure continues at step 112 to move the head down to the centerline of the FWD burst. Thereafter, the tape is wound to the LP hole at step 114 and a successful return is signaled at step 116.

Figure 5:
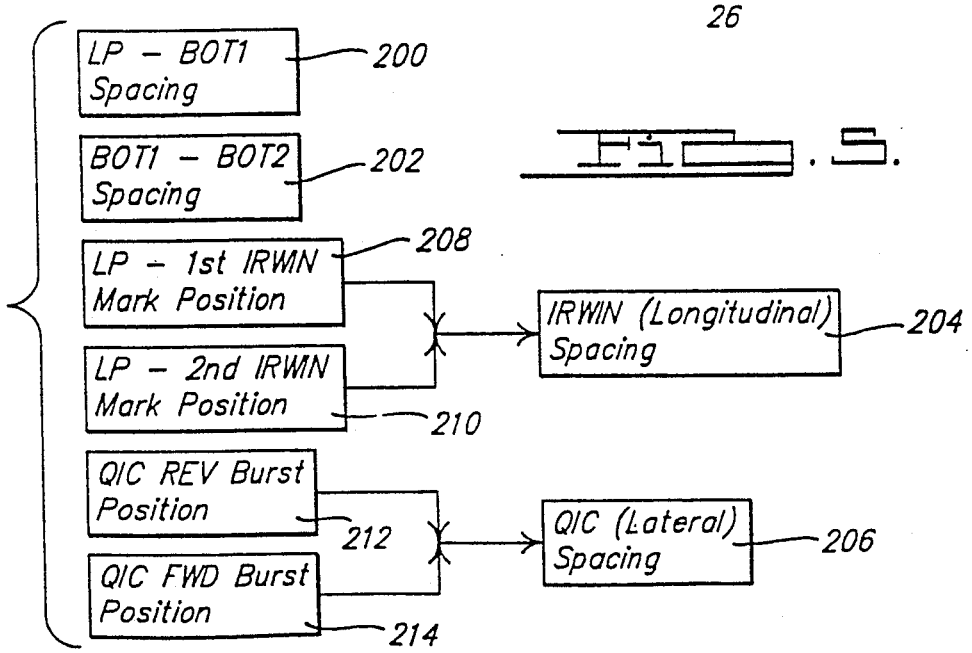
FIG. 5 is a block diagram illustrating the presently preferred data structure implemented by the preferred software embodiment.

From the foregoing it may be seen that the present tape format identifying system gathers data from which the tape format identification is made. The data gathering takes place while the tape is being moved to its starting position for use. Although more data can be gathered during this investigative procedure, FIG. 5 shows a presently preferred data structure. As tape head location data, physical format data and various spacing data are collected, they may be stored at memory locations or registers corresponding to the data structure shown in FIG. 5. FIG. 5 includes a storage location or register for storing the LP-BOT1 spacing. In FIG. 5 this datum is designated by reference numeral 200. In addition, the presently preferred data structure also includes a storage location for storing the BOT1-BOT2 spacing at datum 202. These data (200 and 202) are used to identify the physical layout or cartridge type.

The presently preferred data structure also includes a longitudinal spacing datum 204, used in recognizing the Irwin or Acutrack format. The data structure also includes a lateral spacing datum 206, used to identify the QIC format. In the presently preferred embodiment the longitudinal spacing datum may be derived from information gathered during the search for longitudinally spaced marks. More specifically, the position of the first and second longitudinally spaced marks (or Irwin mark positions) may be noted as a distance from the LP hole. These position data may be stored as data 208 and 210, respectively. Data 208 and 210 may then be arithmetically subtracted to arrive at the longitudinal spacing datum 204.

Similarly, the QIC REV burst position and the QIC FWD burst position can be stored as data 212 and 214, respectively. These data 212 and 214 may be arithmetically subtracted to arrive at the lateral spacing datum 206. Preferably the data stored as 212 and 214 would represent the centerline positions of the QIC REV and QIC FWD bursts.

The presently preferred sequence of steps outlined in FIG. 4 essentially gathers the data needed to fill in the data structure of FIG. 5. In this regard, although the actual magnetic mark position data 208, 210, 212 and 214 may be temporarily stored, a working embodiment can be constructed whereby only the physical hole spacing data 200 and 202 and the magnetic spacing data 204 and 206 are stored. Furthermore, the data need not be stored indefinitely. Once the system has used the data to determine the cartridge type and tape format, the data stored in the data structure of FIG. 5 need not be retained.

The presently preferred embodiment acquires the LP-BOT1 spacing datum 200 and the BOT1-BOT2 spacing datum 202 while moving the tape longitudinally and searching for physical format holes. The tape drive mechanism has a tachometer mechanism associated with it, not unlike the odometer of a vehicle. By resetting the tape position counter to zero when the LP hole is crossed, the longitudinal position of the transducer head may be referenced to the LP hole. Thus once referenced to the LP hole, the value stored in the tape counter comprises a head location datum indicative of the longitudinal position of the transducer head relative to the tape.

By indexing the transducer longitudinal position to the LP hole in this fashion, it is possible for the system to simultaneously obtain physical format data indicative of the cartridge type while obtaining data indicative of the magnetic format. In the presently preferred embodiment as the tape is moved longitudinally (and the tape counter incremented or decremented accordingly), longitudinally spaced magnetic marks are located and stored as data 208 and 210. These data are automatically referenced to the LP hole because the tape counter is zeroed or reset when the LP hole is detected. By appropriate arithmetic subtraction of the position data 208 and 210, the lateral spacing datum is obtained and stored as datum 204.

Similarly, in order to obtain the lateral spacing datum for storage at 206, the transducer head is moved laterally (in a ping-pong-like search pattern) while moving the tape longitudinally back and forth. The position of the REV and FWD bursts, if any are found, may be derived from the head position controller mechanism and stored as values or data 212 and 214. These data may then be arithmetically subtracting to arrive at a lateral spacing datum stored at 206.

Once all of the above data is collected, it may be analyzed according to the flowchart of FIG. 4 in order to identify the format of the data storage tape. It should be recognized that although the presently preferred embodiment searches for the longitudinally spaced magnetic marks before the laterally spaced magnetic marks, it is possible to implement the invention searching for the laterally spaced marks first and the longitudinally spaced marks second.

As illustrated by the flowchart of FIG. 4 the tape identification scheme will automatically terminate once the tape format has been identified with certainty. Thus in some instances it may not be necessary to search for laterally spaced marks (i.e., the tape is found to be of the high density Irwin or Acutrack type). If it is desired to optimize the search pattern for Irwin or Acutrack type tapes, the longitudinal spacing tests may be performed first, since this would allow the Irwin tape format to be identified more quickly (on the average). On the other hand, if it is desired to optimize the search pattern for QIC type types, then the lateral spacing tests may be performed first.

Although the invention is applicable to a wide variety of different physical hardware configurations, a presently preferred hardware configuration is depicted in FIG. 6. As illustrated, the tape drive system 220 is coupled through an interface adaptor 222 (or optionally through a SCSI interface not shown) to the host computer 224. The host computer includes the usual power supply 226 and controller card 228.

The tape drive mechanism is preferably a microprocessor-based system having microprocessor 230 with associated random access memory or RAM of sufficient size to store all operating parameters and variables and to implement any necessary input/output buffers. For example, the data structure of FIG. 5 may be implemented using some of the RAM available to microprocessor 230.

Microprocessor 230 controls a motion and speed control circuit 232 which is responsible for controlling the tape drive motor 234 through the usual cartridge drive roller 236.

Similarly, microprocessor 230 controls the position controller 238 which in turn drives the lead screw mechanism 240 which is responsible for positioning the read/write head or transducer 242 through the usual positioner arm 244. The tape cartridge is illustrated at 246.

The read/write head is coupled through a switchable read filter network 248 and also to a write circuit 250. The read filter network 248 is in turn coupled to the read circuit 252. The read and write circuits communicate through the interface adaptor 222 to the host computer 224. Optical hole sensor 258 detects the physical format holes in the tape and communicates their location to microprocessor 230. Power for the tape drive mechanism is supplied through the interface adaptor from the host power supply 226. Preferably a power filtering and isolation circuit 254 and a power-up reset circuit 256 are provided to condition the power and to ensure that the microprocessor starts with the proper operating instructions upon power-up.

From the foregoing it will be seen that the present invention provides a solution to allow the computer user to employ a variety of different tape formats using a single tape drive mechanism. By being able to automatically detect all of the popular tape formats, the present invention allows the tape to be read and/or written in the tape's native format or in a different format without a great deal of user intervention. The format detection and identification system is efficient in that it is capable of being performed while the load point seeking algorithm is performed. By collecting both physical data and magnetic data simultaneously and on the fly while the tape head is positioned at the starting point or load point, maximum efficiency is attained.

While the invention has been illustrated and described in its presently preferred embodiment, it will be understood that certain modifications can be made without departing from the spirit of the invention as set forth in the appended claims.

APPENDIX

```
;------------------------------------------------
--;
;       IRWIN LOAD POINT MODULE
;
;       HUNTER    - GAIN SET VERSION
;
;       IRWIN MAGNETICS
;
;       08/13/91
;
;
;
;                                   ;
;       DERIVED FROM LDP01_3L.SRC (ENHANCED CODE)
;                                   ;
;                                   ;
;       1.0 - MAKE NEW SET OF "HUNTER" MODULES
;
;             09/04/91
;
;
;
;       1.1 - RE-WRITE ROUTINE FOR DC2300 CARTRIDGES
;
;             - ADD QIC40 AND QIC80 RECOGNITION
;
;             - RE-EQUATE "BIT EQUATES" FROM "Bx" TO "BITx"
;
;             11/27/91
;
;
;
;       1.2 - REVERT TO NORMAL EOT ROUTINE AFTER LOADPOINT
;
;             BEFORE CHECK FOR EMBEDDED L.P. FOR SERVO
;
;             - ADD QIC-80 READ (CONDITIONAL)
;
;             03/13/92
;
```

```
;
;
;               1.3 - RE-WRITE LOADPT AS STATE MACHINE TO HANDLE
;                     TAPES WITH ODD DATA PATTERNS (E.G. SPEED
TAPE);
;                   - ADD CONDITIONAL MOTOR DIRECTION FOR TIN_MAN
;
;                     03/20/92
;
;
;
;
;-----------------------------------------------------------
--;
;
.SUBTITLE "HUNTER LOAD POINT MODULE REV 1.3  03/20/92"
;
;
;
;       DENSITY IDENTIFICATION STATES
;
LOCKED          .EQU 0                  ; DENSITY IS LOCKED IN
ARMED           .EQU 1                  ; BEGIN PROCESS AT LEADING
EDGE OF NEXT HOLE
BURST_1_OK      .EQU 2                  ; FIRST QUALIFIED IRWIN
BURST FOUND
BURST_2_OK      .EQU 3                  ; 2ND QUALIFIED BURST FOUND
- PROCESS RESULTS AT NEXT HOLE

LOADPT:   AND   XXXXXXXXXXXXXXXXXXXXXXXX
     AND   XXXXXXXXXXXXX
     AND   XXXXXXXXXXXXXXXXXXXXXX         ; CLEAR QIC_FORMAT
RECOGNITION MODE
     TM    PORT3,#CARTPRES
     JP    Z,LPRET                        ; TEST FOR CART.
     TM    TCTLH,#SVW_ERR
     JP    NZ,LPRET                       ; QUIT IF CART. HAS SERVO ERROR
;
;       BEGIN LOAD PROCEDURE
;
     LD    STATE_VAR,#LOCKED
     LD    XXXXXXXXXX                     ; USE 50 IPS
     CALL  BUSY_ON                        ; GO BUSY
     AND   XXXXXXXXXXXXXXXXXXXXXXXXXXX    ; CLEAR HEAD LOCK MODE
     DI                                   ; PROTECT IMR
     AND   XXXXXXXXXXXXXXXX               ; CLEAR REQUESTS
     OR    XXXXXXXXXX                     ; ENABLE CART PRES
INTERRUPT
     AND   XXXXXXXXXXXXXXXXXXXXXXXXXXXXX  ; POLL FOR EOT AND
DISABLE COMMANDS
        EI
;
;       LOCATE HEAD AGAINST MECH. STOP
;
     LD    XXXXXXXXXXXXXXXXXXXXXXXXXXXXXXXX    ; USE LOW
POWER
     LD    XXXXXXXXXXXXXXXXXXX
```

```
        LD      XXXXXXXXXXXXXXXXXXXX
        CALL STEPUT
;
;       OPEN LOOP POSITION OVER TRACK 1
;
        CLR     SDF_A                           ; NORMAL RATE, FULL POWER
; KIT XXXXXXXXXXXXXXXXXZZZZZZZZZZZZZZXXXXXXXXXXXXXX REV UP TO LDP01_0H
        LD
        LD
        TM      CONFIG,#ONE_INCH
        JR      NZ,LD1
        LD
        LD
LD1:    CALL STEPUT
; KIT XXXXXXXXXXXXXXXXXZZZZZZZZZZZZZZXXXXXXXXXXXXXX REV UP TO LDP01_0H
        LD
        TM      AVNUM_A,#GAIN_OK                ; SEE IF FIRST L-P FOR THIS CART
        JR      NZ,NOT1ST
        LD      XXXXXXXXXXXXXXXXX               ; MARKER DETECT AT GAIN=50 DECIMAL.
;
;       TEST FOR TAPE IN CARTRIDGE
;
NOT1ST: LD      XXXXXXXXXXXXXXXX                ; SET PREFFERED DATA RATE LEVELS.
        CALL SETGAIN                            ; SET INITIAL GAIN.
        TM      PORT3,#EOTI                     ; LOOK FOR TAPE
        JR      NZ,BEGIN_LOAD_POINT
        CALL TSTARTI                            ; GIVE MOTOR A KICK
        OR      XXXXXXXXXXXXXXXXXXXXXXXXX
        TM      PORT3,#EOTI                     ; LOOK FOR TAPE AGAIN
        JR      NZ,BEGIN_LOAD_POINT
        LD      XXXXXXXXXXXXXXX                 ; NO TAPE IN CARTRIDGE
        CALL FLAG_ERROR
        JP      LPND1                           ; ERROR EXIT FOR TAPE RUN OFF
;
;       FORWARD 40" OR UNTIL SINGLE HOLE
;
BEGIN_LOAD_POINT:
        CALL MBRAKE
        LD      XXXXXXXXXXXXXXXX
        OR      XXXXXXXXXXXXXXXXXXX             ; USES DIFFERENT EOT SERVICE ROUTINE
        DI
        AND     XXXXXXXXXXXXXXXXXXXXXXXXXXX
        OR      XXXXXXXXXXXXXXXXXXXXXX
        EI
        LD      XXXXXXXXXXXXX                   ; SAMPLE TACH TRANSITIONS
; KIT XXXXXXXXXXXXXXXXXZZZZZZZZZZZZZZXXXXXXXXXXXXXX REV UP TO LDP01_3H
;       AND     XXXXXXXXXXXXX                   ; SELECT PHYSICAL FORWARD
        CALL SEL_FWD
```

```
; KIT XXXXXXXXXXXXXXXXZZZZZZZZZZZZZXXXXXXXXXXXXX REV UP TO
LDP01_3H
GO_40_INCHES:
     LD    XXXXXXXXXXXXXXXXXX              ; 40 INCHES AT 69
TACHs PER INCH
     LD    XXXXXXXXXXXXXXXXXX
     CLR   XXXXX
;
     CALL  TSTART                          ; START CAPSTAN
     LD    XXXXXXXXXXXXXXXXX
     CALL  HOLE_PATROL
;
     CP    HOLE_TYPE,#DOUBLE
     JR    EQ,GO_40_INCHES                 ; RESET TO 40 INCHES
AND TRY AGAIN

CALL  RAMP_ROOM
     CALL  MBRAKE

;
;          REVERSE UNTIL DOUBLE HOLE
;
LOAD_MOTION_2:
     LD    XXXXXXXXXXXXXXXXX
     LD    XXXXXXXXXXXXXXXXX
     CLR   XXXXXXXX
; KIT XXXXXXXXXXXXXXXXXZZZZZZZZZZZZZXXXXXXXXXXXXX REV UP TO
LDP01_3H
;    OR    XXXXXXXX                        ; SELECT PHYSICAL REVERSE
     CALL  SEL_REV
; KIT XXXXXXXXXXXXXXXXXZZZZZZZZZZZZZXXXXXXXXXXXXX REV UP TO
LDP01_3H
     LD    XXXXXXXXXX                      ; GO UNLIMITED LENGTH
     LD    XXXXXXXXXX
     CLR   XXXXX
     CALL  TSTART
     CALL  HOLE_PATROL

CP    C3F_A,#1
     JR    EQ,LOAD_MOTION_2                ; RESET TO MAX DISTANCE

CP    HOLE_TYPE,#SINGLE
     JR    NE,BEGIN_LOAD_POINT

FIND_DOUBLE_HOLE:
     LD    HOLE_TYPE,#NO_HOLE
EXTEND_SEARCH_RANGE:
     LD    XXXXXXXXXX                      ; GO UNLIMITED LENGTH
     LD    XXXXXXXXXX
     CLR   XXXXX

CALL  HOLE_PATROL

CP    HOLE_TYPE,#SINGLE
     JR    EQ,FIND_DOUBLE_HOLE
     CP    C3F_A,#1
        JR  EQ,EXTEND_SEARCH_RANGE         ; RESET TO MAX
```

DISTANCE
;
;       EXTRACT "L.P. TO BOT-1" HOLE SPACING
;
AT_BOT_1:
        LD      HOLE_TYPE,#NO_HOLE
        LD      STATE_VAR,#LOCKED
;
;       DETERMINE CARTRIDGE TYPE
;
        AND     XXXXXXXXXXXXXXXXXXXXXXXXXXXXXX)
        LD      XXXXXXXXXXXXXXX                         ; START WITH ILLEGAL
CART TYPE
        LD      EAH,#>((39*1000000)/TACH_PTCH)
        LD      EAL,#<((39*1000000)/TACH_PTCH)
        SUB     XXXXXXXXXXXXXXXX
        SBC     XXXXXXXXXXXXXXXX
        JP      MI,ILGL_CART

LD      EAH,#>((15*1000000)/TACH_PTCH)
        LD      EAL,#<((15*1000000)/TACH_PTCH)
        SUB     XXXXXXXXXXXXXXXX
        SBC     XXXXXXXXXXXXXXXX
        JP      PL,ILGL_CART

LD      EAH,#>((33*1000000)/TACH_PTCH)
        LD      EAL,#<((33*1000000)/TACH_PTCH)
        SUB     XXXXXXXXXXXXXXXX
        SBC     XXXXXXXXXXXXXXXX
        JP      PL,C_TYPEA

OR      XXXXXXXXXXXXXXXXXXXXXXXXXXX      ; DC2000LL
        LD      XXXXXXXXXXXXX
        JR      CART_TYPE_OK

C_TYPEA:LD      EAH,#>((27*1000000)/TACH_PTCH)
        LD      EAL,#<((27*1000000)/TACH_PTCH)
        SUB     XXXXXXXXXXXXXXXX
        SBC     XXXXXXXXXXXXXXXXXXX
        JP      PL,C_TYPEB

OR      XXXXXXXXXXXXXXX                  ; DC2000
        LD      XXXXXXXXXXXXX
        JR      CART_TYPE_OK

C_TYPEB:LD      EAH,#>((21*1000000)/TACH_PTCH)
        LD      EAL,#<((21*1000000)/TACH_PTCH)
        SUB     XXXXXXXXXXXXXXXX
        SBC     XXXXXXXXXXXXXXXX
        JP      MI,C_TYPEC
        OR      XXXXXXXXXXXXXXX                  ; DC1000
        LD      XXXXXXXXXXXXX

;
;       DETERMINE DENSITY/FORMAT
;

```
CART_TYPE_OK:
        LD    XXXXXXXXXX              ; GO MAX TO NEXT HOLE
        LD    XXXXXXXXXX
        CLR   XXXXX

LD    HOLE_TYPE,#NO_HOLE
        CALL  HOLE_PATROL

CALL  MBRAKE
        LD    EAH,#>((135*100000)/TACH_PTCH)
        LD    EAL,#<((135*100000)/TACH_PTCH)
        SUB   XXXXXXXXXXXXXX
        SBC   XXXXXXXXXXXXXX
        JP    PL,CART_REALLY_OK

CP    XXXXXXXXXXXX            ; IF THINK DC2000
        JR    EQ,CALL_IT_2110
        LD    XXXXXXXXXXXX            ; DC2165
        JP    ILGL_CART
CALL_IT_2110:
LD    XXXXXXXXXXXXX
        JP    ILGL_CART

CART_REALLY_OK:
; KIT XXXXXXXXXXXXXXXXXXZZZZZZZZZZZZZZXXXXXXXXXXXXXX REV UP TO
LDP01_3H
;       AND   XXXXXXXXXXXX            ; SELECT PHYSICAL FORWARD
        CALL  SEL_FWD
; KIT XXXXXXXXXXXXXXXXXXZZZZZZZZZZZZZZXXXXXXXXXXXXXX REV UP TO
LDP01_3H
        LD    XXXXXXXXXX              ; GO MAX TO NEXT HOLE
        LD    )" XXXXXXXXX
        CLR   XXXXX
        LD    HOLE_TYPE,#NO_HOLE      ; HIGH DENSITY IRWIN FORMAT
- SEEK TRACK 0
        CALL  MSTRT                   ; START CAPSTAN
        CALL  HOLE_PATROL             ; MOVE INTO BOT_2 - BOT_1

; KIT XXXXXXXXXXXXXXXXXXZZZZZZZZZZZZZZXXXXXXXXXXXXXX REV UP TO
LDP01_0H
        CP    XXXXXXXX
        JP    EQ,QIC_DETECT           ; NOT IRWIN HIGH DENSITY -
TRY QIC
; KIT XXXXXXXXXXXXXXXXXXZZZZZZZZZZZZZZXXXXXXXXXXXXXX REV UP TO
LDP01_0H

LD    HOLE_TYPE,#NO_HOLE
        LD    XXXXXXXXXX              ; GO MAX TO NEXT HOLE
        LD    XXXXXXXXXXXXXX
        CLR   XXXXX
        CALL  HOLE_PATROL             ; MOVE INTO BOT_1 - LP ZONE
        CALL  MBRAKE
;
;       LOAD POINT COMPLETE
;
```

```
TRK_0_SEEK:
      AND     XXXXXXXXXXXXXXXXXXXXXXX  ; REVERT TO NORMAL EOT ISR
      AND     XXXXXXXXXXXXX            ; LOAD POINT FOUND
      OR      XXXXXXXXX
         OR        XXXXXXXXX           ; CART. LOADED
      CLR  XXXXXX
      CP   TCMD,#LOADPT_N              ; IF IMBEDDED SERVO
COMMAND, STAY BUSY AND RETURN
      JR   NE,LPND2
; KIT XXXXXXXXXXXXXXXXXZZZZZZZZZZZZZXXXXXXXXXXXXXXX REV UP TO
LDP01_0H
      TM   XXXXXXXXXXXXXXX
      JR   NZ,TTYPE1
      CP   XXXXXXXXX1                  ; ONLY WORK WITH 110/120 OR
125/145 TAPES
      JR   UGT,LPND2                   ; SKIP SEARCH FOR ZERO
;
TTYPE1:   CP    DENS_A
      JR   UGT,LPND2                   ; SKIP SEARCH FOR ZERO IF
UNKNOWN TAPE TYPE
; KIT XXXXXXXXXXXXXXXXXZZZZZZZZZZZZZXXXXXXXXXXXXXXX REV UP TO
LDP01_0H
      CLR  XXXXXX                      ; GET READY TO SEEK TRACK 0
      CLR  X
      LD   XXXXX
      TM   AVNUM_A,#GAIN_OK            ; SEE IF FIRST L-P FOR THIS
CART
      JR   NZ,SKIP1
      LD   XXXXXXXXXXXXXXXXX           ; INITIAL GAIN SET AT 30
DECIMAL.
      CALL SETGAIN
SKIP1:
; KIT XXXXXXXXXXXXXXXXXZZZZZZZZZZZZZXXXXXXXXXXXXXXX REV UP TO
LDP01_1H
      CP   DENS_A,XX
      JR   EQ,LPND2
; KIT XXXXXXXXXXXXXXXXXZZZZZZZZZZZZZXXXXXXXXXXXXXXX REV UP TO
LDP01_1H
      CALL NOPREP                      ; GO CENTER ON TRACK 0
      CALL MBRAKE
      AND  XXXXXXXXXXXXX               ; RETURN HERE ON BOT_INT
; KIT XXXXXXXXXXXXXXXXXZZZZZZZZZZZZZXXXXXXXXXXXXXXX REV UP TO
LDP01_3H
;     OR   XXXXXXXX                    ; SELECT PHYSICAL REVERSE
      CALL SEL_REV
; KIT XXXXXXXXXXXXXXXXXZZZZZZZZZZZZZXXXXXXXXXXXXXXX REV UP TO
LDP01_3H
      CALL TFAST
LPLOOP:   TM   TSTAT,#BOT
      JR   Z,LPLOOP
      CALL MBRAKE
LPND2:    OR         XXXXXXXXXXXXXXXXXXX
          CP         XXXXXXXXXXXXX             ; SERVO WRITE
COMMAND?
          JR         NE,LPEND                  ; STAY BUSY FOR SERVO WRITE
LPND1:    CALL    BUSY_OFF                     ; GO NOT BUSY
          AND  XXXXXXXXXXXXXXXXXXXXXXX ; REVERT TO NORMAL EOT ISR
```

```
LPEND:  DI
        AND     XXXXXXXXXXXXXX          ; CLEAR COMMAND REQUESTS
        OR      XXXXXXXXXX              ; RE-ENABLE COMMANDS
        EI
LPRET:  RET
;
;       QIC FORMAT RECOGNITION (CARTRIDGE IS QIC, BLANK OR IRWIN LOW DENSITY)
;
QIC_DETECT:
        CALL    MBRAKE
        LD      XXXXXXXXXX              ; USE 50 IPS FOR NOW
        OR      XXXXXXXXXXXXXXXXXXXXXXXX ; ENABLES REFERENCE BURST SEARCH IN STEPPER
        AND     XXXXXXXXXXXXXX          ; LOAD POINT FOUND
        OR      XXXXXXXXXX              ; FOR NOW PRETEND WE'RE AT BOT
        AND     XXXXXXXXXXXXXXX         ; SCAN UP
        LD      XXXXXXXXXXXXXXXXXXXXXX
        LD      XXXXXXXXXXXXXXXXXXXXXX

REV_BURST_SCAN:
        CALL    PING                    ; BEGINS BOT_1 <->LP PING-PONG
        CALL    STEPUT                  ; SLEW HEAD UNTIL ...

TM      TCTLH,#SIGDET           ;    ...END OF PASS OR EDGE OF BURST?
        JR      NZ,LOWER_REV
        LD      XXXXXXXXXX
        OR      XXXXXXXXXX
        JR      Z,QIC_SCAN_FAIL
        CALL    MBRAKE
        JR      REV_BURST_SCAN          ; CONTINUE SCAN
QIC_SCAN_FAIL:
        CALL    PONG                    ; WAIT FOR PASS TO END
        TM      TSTAT,#(BOT.OR.EOT)
        JR      Z,QIC_SCAN_FAIL

CALL    MBRAKE
        CLR     XXXXXX
        JP      QIC_EOT                 ; AIN'T NO BURST HERE!
;
;       QIC BURST FOUND  -   FIND C-LINES AND MEASURE FWD/REV SKEW
;                       REVERSE BURST COMES FIRST
;
LOWER_REV:
        CALL    PONG                    ; WAIT FOR PASS TO END
        TM      TSTAT,#(BOT.OR.EOT)
        JR      Z,LOWER_REV

CALL    MBRAKE

TM      TSTAT,#EOT
        JR      NZ,LOG_REV_BURST
        CALL    PING                    ; MOVE TO EOT
        JR      LOWER_REV
```

```
LOG_REV_BURST:

LD      STEPCH_A,#>(5000*10)/SCREW_PTCH     ; GET 5 MILS
BELOW REV BURST
        LD      STEPCL_A,#<(5000*10)/SCREW_PTCH
        OR      XXXXXXXXXX
        AND     XXXXXXXXXXXXXXXXXXXXXX
        CALL    STEPUT

LD      STEPCH_A,#>(15000*10)/SCREW_PTCH    ; LOAD SEARCH
LIMIT FOR LOWER EDGE
        LD      STEPCL_A,#<(15000*10)/SCREW_PTCH
        OR      XXXXXXXXXXXXXXXXXXXXXXXXXXXXXXXXXX  ; LOOK FOR
POSITIVE EDGE
        AND     XXXXXXXXXXXXXXX                     ; SCAN UP
        CALL    PING
        CALL    STEPUT

TM      TCTLH,#SIGDET
        JR      NZ,FOUND_REV_BURST

LD      XXXXXXXXXXXXXXXXXXXXXXXXXXXXXX ; FAILED SURVEYING QIC
REFERENCE BURST
QIC_LOAD_ERROR:
        CALL    MBRAKE
        CALL    FLAG_ERROR
        LD      XXXXXXXXXXXXXXXXX           ; LOAD FAILED
        JP      LPND1                       ; ERROR EXIT FOR TAPE RUN
OFF

FOUND_REV_BURST:
        CLR     XXXXXX                      ; LOG LOCATION OF LOWER
EDGE OF REVERSE BURST
        CLR     XXXXXXXX                    ; LOAD SEARCH LIMIT FOR UPPER
EDGE
        LD      STEPCL_A,#(24000*10)/SCREW_PTCH
        AND     XXXXXXXXXXXXXXXXXXXXXXXX ; LOOK FOR NEGATIVE EDGE
        CALL    STEPUT
        TM      TCTLH,#SIGDET
        JR      NZ,LOG_REV_UPPER

LD      XXXXXXXXXXXXXXXXXXXXXXXXXXXXXXXX ; FAILED SURVEYING QIC
REFERENCE BURST
        JR      QIC_LOAD_ERROR

LOG_REV_UPPER:
        RCF
        RRC     XXXXXX                      ; CALCULATE DISPLACEMENT
FROM C-LINE

;
;       REVERSE REFERENCE BURST SURVEY COMPLETE - CONTINUE UP TO
FORWARD BURST
;
```

```
LOWER_FWD:
     CALL PONG                          ; WAIT FOR CURRENT PASS TO END
     TM   TSTAT,#(BOT.OR.EOT)
     JR   Z,LOWER_FWD
     CALL MBRAKE

LD   STEPCH_A,#>(5000*10)/SCREW_PTCH   ; GET 5 MILS
CLEAR OF REV BURST
     LD   STEPCL_A,#<(5000*10)/SCREW_PTCH
     CALL STEPUT

LD   STEPCH_A,#>(15000*10)/SCREW_PTCH  ; LOAD SEARCH
LIMIT FOR LOWER EDGE
     LD   STEPCL_A,#<(15000*10)/SCREW_PTCH
     OR   XXXXXXXXXXXXXXXXXXXXXXXXXXXXXXXX ; LOOK FOR
POSITIVE EDGE

CALL PING
     CALL STEPUT

TM   TCTLH,#SIGDET
     JR   NZ,FOUND_FWD_BURST
     LD   XXXXXXXXXXXXXXXXXXXXXXXXXXXX ; FAILED SURVEYING QIC
REFERENCE BURST
     JP   QIC_LOAD_ERROR

FOUND_FWD_BURST:                       ; LOWER EDGE OF FWD REF
BURST @ BOT_1
     LD   XXXXXXXXXXXXXXXXXX           ; LOG LOCATION OF LOWER
EDGE OF FORWARD BURST
     CLR  XXXXXXXX                     ; LOAD SEARCH LIMIT FOR UPPER
EDGE
     LD   STEPCL_A,#(24000*10)/SCREW_PTCH
     AND  XXXXXXXXXXXXXXXXXXXXXXXX     ; LOOK FOR NEGATIVE
EDGE
     CALL STEPUT

TM   TCTLH,#SIGDET
     JR   NZ,LOG_FWD_UPPER

LD   XXXXXXXXXXXXXXXXXXXXXXXXXXXXXXXX ; FAILED SURVEYING QIC
REFERENCE BURST
     JP   QIC_LOAD_ERROR

LOG_FWD_UPPER:
     LD   XXXXXXXX
     SUB  XXXXXXXXXXXXX                ; CALCULATE WIDTH OF FWD.
REF. BURST
     RRC  X                            ; CURRENT DISPLACEMENT FROM
C-LINE OF FWD. REF.

LD   XXXXXXXXXX                   ; STEPS TO GET BACK DOWN TO
C-LINE OF TRACK 0
     CLR  XXXXXXXX
     OR   XXXXXXXXXX                   ; PREPARED TO POSITION TO
TRACK 0

;
```

```
;       THIS IS THE OFFICIAL HEAD POSITION REFERENCE FOR THIS
CARTRIDGE
;
        LD      XXXXXXXXXXXXXXXXXX
        LD      XXXXXXXX
        SUB     XXXXXXXXXXXXXXXXXX
        LD      XXXXXXXXXXXX
        LD      XXXXXXXXXXXXXXXX           ; NUMBER OF TRACKS
        CP      ODD_TRK_SKEW,#(21000*10)/SCREW_PTCH
        JR      UGT,QIC_DENS_SET
        LD      XXXXXXXXXXXXX              ; QIC 80 NOT ALLOWED FOR
THIS DRIVE
        LD      XXXXXXXXXXXXXXXX           ; NUMBER OF TRACKS
QIC_DENS_SET:
        CALL    PONG                       ; WAIT FOR PASS TO END
        TM      TSTAT,#(BOT.OR.EOT)
        JR      Z,QIC_DENS_SET

CALL    MBRAKE

QIC_EOT:
        TM      TSTAT,#EOT
        JR      NZ,QIC_LOAD_FINISHED       ; FINISH UP AT
PSEUDO-EOT (DATA SIDE OF L.P.)
        CALL    PING                       ; MOVE TAPE
QIC_EOT_1:
        CALL    PONG                       ; WAIT FOR PASS TO END
        TM      TSTAT,#(BOT.OR.EOT)
        JR      Z,QIC_EOT_1
        CALL    MBRAKE

QIC_LOAD_FINISHED:
        AND     XXXXXXXXXXXXXXXXXXXXXXXX   ; DISABLE SEARCH
        CALL    PING                       ; GET ON THE BOT_1 SIDE OF L.P.
HOLE
        CALL    RAMP_ROOM                  ; LEAVE RAMP-UP ROOM
        CALL    MBRAKE

CP      XXXXXXXX                   ; BLANK OR IRWIN 120 FORMAT
        JP      EQ,TRK_0_SEEK

.IFFALSE  READ_QIC_80
        CP      DENS_A,#QIC_40
        JR      NE,QIC_80_LOADED
.ENDIF
;
;       CENTER HEAD ON QIC TRACK 0
;
        CALL    STEPUT                     ; REGISTERS PRE-LOADED
ABOVE
        CLR     XXXXXXXXX                  ; CHEZ TRACK0
        CLR     XXXXXT
        AND     XXXXXXXXXXXXXXX            ; TURN OFF MAPPER
;
;       QIC LOAD POINT COMPLETE
;
        JP      TRK_0_SEEK
```

```
QIC_80_LOADED:
      LD    XXXXXXXXXXXXXXXXXXXXX          ; QIC 80 TAPE NOT
ALLOWED FOR THIS DRIVE
      CALL  FLAG_ERROR
      JP    LPND1

;
;     DECODE 900 oe CARTRIDGE TYPE (THEN DECLARE ILLEGAL)
;
C_TYPEC:LD    XXXXXXXXXXXXXXXXXXX          ; INSERT STOP BIT
      LD    XXXXXXXXXXXXXXXXX              ; CELLS ARE 2.5 INCHES WIDE
      LD    XXXXXXXXXXXXXXXXX              ;    PLUS 1 INCH
DISPLACEMENT
      CLR   XXXXX
NEXT_CELL:
      LD    XXXXXXXXXXXXXXXXXX
IN_CELL:
      CALL  HOLE_PATROL
      CP    HOLE_TYPE,#DOUBLE
      JR    EQ,CELL_ENDED
      CP    XXXXXXXX
      JR    EQ,IN_CELL
CELL_ENDED:
      LD    XXXXXXXXXXXXXXXXX              ; GET READY FOR NEXT CELL
      LD    XXXXXXXXXXXXXXXXX              ; CELLS ARE 2.5 INCHES WIDE
      CLR   XXXXX
      CP    HOLE_TYPE,#DOUBLE
      JR    NE,UN_HOLY_CELL
      ADD   XXXXXXXXXXXXXXXXX              ; RESTORE DISPLACEMENT FOR
CELL RE_SYNC
      ADC   XXXXXXXXXXXXXXXXX
UN_HOLY_CELL:
      RRC   XXXXXXXX
      RRC   XXXXXXXX                       ; CARRY FLAG SET IF DOUBLE HOLE
FOUND IN CELL
      RRC   XXXXXXXX                       ; SHIFT IN NEXT BIT
      JR    NC,NEXT_CELL                   ; WATCH FOR STOP BIT
SHIFTED OUT
;
;     PAD OUT LEADING ZEROS
;
      RR    XXXXXXXX
      RR    XXXXXXXX
      RR    XXXXXXXX
;
;     ILLEGAL CARTRIDGE
;
ILGL_CART:
      CALL  MBRAKE
      LD    XXXXXXXXXXXXXXXXXX
; KIT XXXXXXXXXXXXXXXXXXXXZZZZZZZZZZZZZXXXXXXXXXXXXXX REV UP TO
LDP01_3H
;     AND   XXXXXXXXXXXXX                  ; SELECT PHYSICAL FORWARD
      CALL  SEL_FWD
; KIT XXXXXXXXXXXXXXXXXXXXZZZZZZZZZZZZZXXXXXXXXXXXXXX REV UP TO
LDP01_3H
      LD    XXXXXXXXXXXXXXXXXXXXX          ; 70 INCHES AT 69
```

```
TACHs PER INCH
    LD      XXXXXXXXXXXXXXXXXX
    CLR     XXXXX
    CALL    TSTART                      ; START CAPSTAN

ILLEGAL_CART_RESTORE:                   ; GET OUT BEYOND LP HOLE
    CALL    TCNT
    CP      XXXXXXX
    JR      EQ,ILLEGAL_CART_RESTORE
    CALL    MBRAKE

LD      XXXXXXXXXXXXXXXXXX
; KIT XXXXXXXXXXXXXXXXXZZZZZZZZZZZZZXXXXXXXXXXXXXX REV UP TO LDP01_3H
    CALL    SEL_REV
;   OR      XXXXXXX                     ; SELECT PHYSICAL REVERSE
; KIT XXXXXXXXXXXXXXXXXZZZZZZZZZZZZZXXXXXXXXXXXXXX REV UP TO LDP01_3H
    LD      XXXXXXXXXXXXXXXXXX          ; 100 INCHES AT 69 TACHs PER INCH
    LD      XXXXXXXXXXXXXXXXXX
    CLR     XXXXX
    CALL    TSTART                      ; START CAPSTAN
PARK_ILLEGAL_CART:
    CP      HOLE_TYPE,#NO_HOLE
    JR      EQ,PARK_ILLEGAL_CART
    CALL    RAMP_ROOM
    CALL    MBRAKE
    LD      XXXXXXXXXXXXXXXXXX          ; ERROR CODE FOR ILLEGAL CARTRIDGE
    LD      XXXXXXXXX                   ; UNKNOWN FORMAT
    CALL    FLAG_ERROR
    JP      LPND1

HOLE_PATROL:
    CALL    TCNT

CP      HOLE_TYPE,#NO_HOLE          ; CHECK FOR HOLE
    JR      NE,OPEN_WINDOW

CP      STATE_VAR,#BURST_1_OK
    JR      NE,DISTANCE_COMPLETE_TEST

CALL    DEN_SIG_DET
    JR      NC,DISTANCE_COMPLETE_TEST
;
;   EVALUATE SPACING BETWEEN MARKS TO DETERMINE TYPE OF HIGH DENSITY
;
    SUB     XXXXXXXXXXXX
    SBC     XXXXXXXXXXXX
    SUB     XXXXXXXXXXXXXXXXXXXX        ; HALF SPACE
    SBC     XXXXXXXXXXX

DENS_DECODE:                            ; DECODE SPACE BETWEEN TWO BURSTS
    INC     XXXXXXX
```

```
        SUB    XXXXXXXXXXXXXXXXXXXX
        SBC    XXXXXXXXXXX
        JR     PL,DENS_DECODE
        LD     XXXXXXXXXXXXXXX

DISTANCE_COMPLETE_TEST:
        CP     XXXXXXX                    ; CHECK FOR DISTANCE LIMIT
        JR     EQ,HOLE_PATROL
        JR     END_PATROL

OPEN_WINDOW:                              ; OPEN WINDOW FOR SECOND
HOLE OF BOT HOLE PAIR
        LD     XXXXXXXXXXXXXXXXX
        LD     XXXXXXXXXXXXXXXXXX
        SUB    XXXXXXXXXXXXXXXXX          ; CALCULATE DISTANCE SINCE
LAST HOLE
        SBC    XXXXXXXXXXXXXXXXXX
        LD     XXXXXXXXXXX                ; GO UNLIMITED LENGTH
        LD     XXXXXXXXXXX
        CLR    XXXXX

CP     STATE_VAR,#LOCKED
        JR     EQ,EYES_CLOSED

LD     XXXXXXXXXXXXXXX
        CLR    XXXXXXXX
        CP     STATE_VAR,#ARMED
        JR     NE,EYES_CLOSED

EYES_OPEN:
        CALL   DEN_SIG_DET
        JR     NC,NO_SIGNAL_YET

INC    XXXXXXXXX
        LD     XXXXXXXXXXXXX              ; LOG LOCATION OF FIRST
BURST
        LD     XXXXXXXXXXXXX
        LD     XXXXXXXXXXXXXXXXXXXXX
        JR     EYES_CLOSED                ; FOUND FIRST MARK - FINISH
WINDOW

NO_SIGNAL_YET:
        CALL   TCNT
        CP     XXXXXXXXXXXXXXXXXXXXXXX    ; WINDOW IS .3 INCHES
WIDE
        JR     UGT,EYES_OPEN

EYES_CLOSED:
        CALL   TCNT
        CP     XXXXXXXXXXXXXXXXXXXXX      ; WINDOW IS .3 INCHES
WIDE
        JR     UGT,EYES_CLOSED

END_PATROL:
        RET
;
;       SEARCH FOR IRWIN DENSITY IDENTIFIER SIGNATURES
```

```
;
DEN_SIG_DET:
     LD   XXXXXXXXXXXXXXXXXX        ; RELOAD FILTER
LEADING_EDGE_DET:
     CALL TCNT

TM   P2,#TIN                   ; POTENTIAL BURST?
     JR   Z,NO_SIGNAL_RET
     DJNZ XXXXXXXXXXXXXXXXX

LD   XXXXXXXXXXXXXXXXXXX       ; MAX LIMIT ON FILTER
TRAILING_EDGE_LIMIT:
     LD   XXXXXXXXXXXXXXXXXX        ; RELOAD FILTER
TRAILING_EDGE_DET:
     CALL TCNT
     DJNZ A,KEEP_LOOKING
     JR   NO_SIGNAL_RET

KEEP_LOOKING:
     TM   P2,#TIN
     JR   NZ,TRAILING_EDGE_LIMIT
     DJNZ D,TRAILING_EDGE_DET
     XXX
     JR   DEN_SIG_RET

NO_SIGNAL_RET:
     XXX
DEN_SIG_RET:
     RET
;
;    SHUTTLES BETWEEN BOT_1 AND L.P.
;
PING:
     CLR  XXXXXXXX
; KIT XXXXXXXXXXXXXXXXXXZZZZZZZZZZZZZXXXXXXXXXXXXX REV UP TO
LDP01_3H
     CALL SEL_REV
;    OR   XXXXXXXX                  ; ASSUME REVERSE
; KIT XXXXXXXXXXXXXXXXXXZZZZZZZZZZZZZXXXXXXXXXXXXX REV UP TO
LDP01_3H
     TM   TSTAT,#BOT
     JR   NZ,FWD_PING
     TM   TSTAT,#EOT
     JR   NZ,PING_GO
FWD_PING:
; KIT XXXXXXXXXXXXXXXXXXZZZZZZZZZZZZZXXXXXXXXXXXXX REV UP TO
LDP01_3H
     CALL SEL_FWD
;    AND  XXXXXXXXXXXX
; KIT XXXXXXXXXXXXXXXXXXZZZZZZZZZZZZZXXXXXXXXXXXXX REV UP TO
LDP01_3H
     JR   PING_GO
PING_GO:CALL   TSTART

; KIT XXXXXXXXXXXXXXXXXXZZZZZZZZZZZZZXXXXXXXXXXXXX REV UP TO
LDP01_3H
     TST_REV
```

```
;       TM      XXXXXXX                 ; WAIT TO GET CLEAR OF CURRENT
END
; KIT XXXXXXXXXXXXXXXXXZZZZZZZZZZZZZZXXXXXXXXXXXXXX REV UP TO
LDP01_3H
        JR      NZ,SCAN_REV
SCAN_FWD:
        CP      HOLE_TYPE,#DOUBLE       ; GET PAST BOT_1
        JR      NE,SCAN_FWD
        AND     XXXXXXXXXXXXX
        JR      PING_RET
SCAN_REV:
        CP      HOLE_TYPE,#SINGLE       ; GET PAST L.P.
        JR      NE,SCAN_REV
        AND     TSTAT,#.NOT.EOT
PING_RET:
        CLR     HOLE_TYPE
        RET
;
;       END OF LOAD COMMAND FILE
;
.END
```

What is claimed is:

1. A method of identifying the format of a data storage tape comprising:
   moving the tape longitudinally while searching for physical format holes, and generating and storing a physical format datum indicative of locations of the physical format holes for identifying a cartridge type and also at least temporarily storing a head location datum indicative of the longitudinal position of a transducer head relative to the tape;
   moving the transducer head laterally while moving the tape longitudinally searching for laterally spaced magnetic marks and generating and storing a lateral spacing datum indicative of spacing between the laterally spaced magnetic marks when laterally spaced magnetic marks are located;
   moving the tape longitudinally while searching for longitudinally spaced magnetic marks and generating and storing a longitudinal spacing datum indicative of spacing between the longitudinally spaced magnetic marks using the head location datum when longitudinally spaced magnetic marks are located;
   and using at least one of said stored lateral spacing datum and said stored longitudinal spacing datum to identify the format of said data storage tape.

2. The method of claim 1 wherein said step of moving the tape longitudinally while searching for longitudinally spaced magnetic marks is performed substantially concurrently with the step of moving the tape longitudinally while searching for physical format holes.

3. The method of claim 1 wherein said step of moving the tape longitudinally while searching for longitudinally spaced magnetic marks is performed substantially concurrently with the step of moving the tape longitudinally while searching for physical format holes and prior to said step of moving the transducer head laterally while moving the tape longitudinally.

4. The method of claim 1 wherein said step of moving the tape longitudinally while searching for longitudinally spaced magnetic marks is performed by noting the location of said laterally spaced magnetized marks and defining a first and second longitudinal mark position datum relative to said stored head location datum and by computing the arithmetic difference of said first and second longitudinal mark position data to yield said lateral spacing datum.

5. The method of claim 1 wherein said step of moving the transducer head laterally while moving the tape longitudinally searching for laterally spaced magnetic marks is performed by noting the location of an edge of a first magnetic mark, noting the location of an edge of a second magnetic mark, determining the positions of the centerlines of said first and second magnetic marks based on the noted locations of said edges and computing the arithmetic difference of said centerlines to yield said longitudinal spacing datum.

6. The method of claim 1 wherein said step of temporarily storing a head location datum comprises indexing a counter to a physical format hole and incrementing and decrementing said counter in response to longitudinal movement of said tape.

7. The method of claim 1 wherein said step of storing a physical format datum comprises locating a load point (LP) hole and an adjacent beginning of tape (BOT) hole and determining the spacing between said LP hole and said BOT hole.

8. The method of claim 1 wherein said step of storing a physical format datum comprises locating a first beginning of tape (BOT1) hole and an adjacent second beginning of tape (BOT2) hole and determining the spacing between said BOT1 hole and said BOT2 hole.

9. The method of claim 1 wherein said step of using the head location datum is performed by using the head location datum as a reference by which said longitudinally spaced magnetic marks are located.

10. The method of claim 1 wherein said method of identifying the format of a data storage tape is performed while seeking the load point of the tape.

11. A method of identifying the format of a data storage tape of the type having a prepunched load point (LP) hole and at least two prepunched beginning of tape (BOT) holes comprising:

moving the tape longitudinally in a forward direction past said LP hole;

moving the tape longitudinally in a reverse direction to said LP hole and storing a head location datum for use as a measuring reference based on the location of said LP hole;

moving the tape longitudinally in a reverse direction to a first one of said BOT holes and thereafter to a second one of said BOT holes and generating and storing a physical format datum indicative of tape cartridge type based upon the separation between said first and second BOT holes;

moving the tape longitudinally in a reverse direction while searching for longitudianally spaced magnetic marks between said LP hole and said first one of said BOT holes and generating and storing a longitudinally spaced magnetic marks when longitudinally spaced magnetic marks are located;

moving a transducer head laterally while moving the tape longitudinally while searching for laterally spaced magnetic marks between said LP hole and said first one of said BOT holes and generating and storing a lateral spacing datum indicative of spacing between the laterally spaced magnetic marks when laterally spaced magnetic marks are located; and using said physical format datum and at least one of said longitudinal spacing datum and said lateral spacing datum to identify the format of said data storage tape.

12. An apparatus for identifying the format of a data storage tape comprising:

a tape transducer head including read circuit means for reading magnetic marks encoded on a data storage tape;

tape head positioner means for moving the tape head laterally with respect to said tape;

tape motion control means for moving the tape longitudinally in forward and reverse directions;

optical sensing means for detecting physical format holes in the tape indicative of tape cartridge type;

processor means coupled to said tape head positioner means, to said tape motion control means, to said optical sensing means and to said read circuit means;

storage means coupled to said processor means and having capacity for storing at least a first datum indicative of a longitudinal spacing and a third datum indicative of a lateral spacing;

said processor means being preprogrammed to cause said tape motion control means to move said tape longitudinally while simultaneously causing said optical sensing means to search for physical format holes and generating and storing a value as said first datum indicative of locations of the physical format holes based on said search for physical format holes;

said processor means being preprogrammed to cause said tape motion control means to move said tape longitudinally while simultaneously searching for longitudinally spaced magnetic marks and generating and storing a value as said second datum indicative of spacing between the longitudinally spaced marks based on said search for longitudinally spaced magnetic marks;

said processor means being preprogrammed to cause said tape motion control means to move said tape longitudinally while simultaneously causing said tape head positioner means to move said tape head in a lateral search pattern and while further simultaneously searching for laterally spaced magnetic marks and and generating and storing a value as said third datum indicative of spacing between the laterally spaced marks based on said search for laterally spaced magnetic marks; and said processor means being preprogrammed to use said first, second and third data to identify the format of said data storage tape.

* * * * *